(12) United States Patent
Johnson et al.

(10) Patent No.: US 12,254,433 B1
(45) Date of Patent: Mar. 18, 2025

(54) COMPUTER SYSTEMS FOR ANALYZING AND PRESENTING ALERT-BASED INFORMATION

(71) Applicant: Wells Fargo Bank, N.A., San Francisco, CA (US)

(72) Inventors: Daniel Jeffery Johnson, Milwaukee, WI (US); Rachel Nemecek, Charlotte, NC (US); Ramon Joseph Permato Esteves, Bulacan (PH); Rommel B. Limon, Quezon (PH); Kettyl Amoakon, Harrisburg, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/060,666

(22) Filed: Dec. 1, 2022

Related U.S. Application Data

(62) Division of application No. 16/710,289, filed on Dec. 11, 2019.

(51) Int. Cl.
  *G06Q 10/0635* (2023.01)
  *G08B 3/10* (2006.01)
  *G08B 29/10* (2006.01)

(52) U.S. Cl.
  CPC .......... *G06Q 10/0635* (2013.01); *G08B 3/10* (2013.01); *G08B 29/10* (2013.01)

(58) Field of Classification Search
  CPC ....... G06Q 10/0635; G08B 3/10; G08B 29/10
  (Continued)

(56) References Cited

U.S. PATENT DOCUMENTS

| 8,078,486 B1 | 12/2011 | McLean et al. |
| 8,527,317 B2 | 9/2013 | Haddad |

(Continued)

FOREIGN PATENT DOCUMENTS

| JP | 2004178080 A | 6/2004 | |
| WO | 2002027571 A2 | 4/2002 | |
| WO | WO-2021036277 A1 * | 3/2021 | ............. G06N 7/005 |

OTHER PUBLICATIONS

E. Grigoroudis et al. A survey of customer satisfaction barometers: Some results from the transportation-communications sector. European Journal of Operational Research. vol. 152, Issue 2, Jan. 16, 2004, pp. 334-353 (Year: 2004).*

(Continued)

*Primary Examiner* — Abdallah A El-Hage Hassan
(74) *Attorney, Agent, or Firm* — Shumaker & Sieffert, P.A.

(57) ABSTRACT

Techniques are described for analyzing and presenting alert-based information for an enterprise business. In particular, a central device in a computer system receives alerts from other devices associated with different office branches of the enterprise business, and analyzes the alerts on a periodic schedule. For example, every month, the central device may calculate a weighted alert volume by district based on the risk scores calculated for the office branches within the district, calculate an average weighted alert volume across the entire enterprise, and calculate the standard deviation of the average weighted alert volume to determine the alert risk rating for the district. The central device may also analyze the dispositions of the alerts on the period schedule. For example, the central device may determine coaching rates and/or disposition rates by district. The central device may further output the alert and/or disposition information to users in a simple format.

20 Claims, 10 Drawing Sheets

(58) Field of Classification Search
USPC .................................................... 705/7.28
See application file for complete search history.

(56) References Cited

U.S. PATENT DOCUMENTS

| | | | |
|---|---|---|---|
| 8,538,799 B2 | 9/2013 | Haller et al. | |
| 8,706,537 B1* | 4/2014 | Young | G16H 50/30 |
| | | | 705/7.11 |
| 9,733,916 B2 | 8/2017 | Wang et al. | |
| 9,779,386 B2 | 10/2017 | Swierz, III et al. | |
| 9,824,323 B1 | 11/2017 | Weiss et al. | |
| 9,898,767 B2 | 2/2018 | Psota et al. | |
| 9,946,840 B1* | 4/2018 | Kemp | G16H 50/30 |
| 10,089,120 B2 | 10/2018 | Baumecker et al. | |
| 10,194,028 B2 | 1/2019 | Vymenets et al. | |
| 10,331,302 B1* | 6/2019 | Leyden | G06F 3/0482 |
| 10,509,555 B2 | 12/2019 | Noel et al. | |
| 11,188,861 B1 | 11/2021 | Johnson et al. | |
| 2002/0099580 A1 | 7/2002 | Eicher, Jr. et al. | |
| 2002/0138338 A1 | 9/2002 | Trauth et al. | |
| 2004/0177053 A1 | 9/2004 | Donoho et al. | |
| 2005/0055275 A1 | 3/2005 | Newman et al. | |
| 2006/0031110 A1 | 2/2006 | Benbassat et al. | |
| 2007/0112607 A1 | 5/2007 | Tien et al. | |
| 2007/0127693 A1 | 6/2007 | D'Ambrosio et al. | |
| 2007/0174214 A1 | 7/2007 | Welsh et al. | |
| 2008/0091621 A1* | 4/2008 | Breeden | G06Q 40/00 |
| | | | 705/36 R |
| 2008/0195428 A1 | 8/2008 | O'Sullivan | |
| 2009/0048884 A1 | 2/2009 | Olives et al. | |
| 2010/0121776 A1 | 5/2010 | Stenger | |
| 2011/0261049 A1 | 10/2011 | Cardno et al. | |
| 2012/0032961 A1 | 2/2012 | Smith et al. | |
| 2013/0085799 A1 | 4/2013 | Zhang et al. | |
| 2013/0132275 A1* | 5/2013 | Enzaldo | G06Q 20/10 |
| | | | 705/44 |
| 2014/0012623 A1 | 1/2014 | Paulmann | |
| 2014/0047096 A1 | 2/2014 | Kupershmidt et al. | |
| 2014/0210827 A1* | 7/2014 | Alsbury | G06T 11/206 |
| | | | 345/440.2 |
| 2014/0258032 A1 | 9/2014 | Psota et al. | |
| 2015/0086003 A1* | 3/2015 | Khalil | H04M 3/5175 |
| | | | 379/265.06 |
| 2015/0149233 A1 | 5/2015 | Chaudhary et al. | |
| 2015/0178825 A1* | 6/2015 | Huerta | G06Q 40/00 |
| | | | 705/35 |
| 2015/0329912 A1* | 11/2015 | Moreno | A61K 31/566 |
| | | | 506/9 |
| 2015/0332201 A1 | 11/2015 | Bernaudin et al. | |
| 2015/0332419 A9 | 11/2015 | Budlong | |
| 2016/0088099 A1 | 3/2016 | Crudele et al. | |
| 2017/0068963 A1* | 3/2017 | Saxena | G06Q 30/016 |
| 2017/0111381 A1 | 4/2017 | Jones et al. | |
| 2017/0345057 A1 | 11/2017 | Baker, III | |
| 2018/0004948 A1 | 1/2018 | Martin | |
| 2018/0121874 A1 | 5/2018 | Chen et al. | |
| 2018/0165775 A1 | 6/2018 | Bhattacharjee et al. | |
| 2018/0300453 A1 | 10/2018 | Arnaout et al. | |
| 2019/0188616 A1 | 6/2019 | Urban et al. | |
| 2020/0065151 A1* | 2/2020 | Ghosh | G06F 40/295 |
| 2020/0267181 A1* | 8/2020 | Pandey | H04L 63/1466 |

OTHER PUBLICATIONS

Business Wire, "Americas Software is Helping World's Banks Track Money Laundering", Mar. 2000, p. 1377.
Response to Final Office Action dated Dec. 8, 2022 from U.S. Appl. No. 16/710,289, filed Mar. 8, 2023, 15 pp.
Advisory Action from U.S. Appl. No. 16/710,289 dated Mar. 31, 2023, 3 pp.
Response to Final Office Action dated Mar. 31, 2023 from U.S. Appl. No. 16/710,289, filed Apr. 10, 2023, 18 pp.
U.S. Appl. No. 17/456,107, filed Nov. 22, 2021, naming inventors Johnson et al.
"Building a customer service alert system that works", Customer Thermometer. Retrieved from https://www.customerthermometer.com/customerfeedback/customer-service-alert-system/. May 2019, 5 pages.
Crosman, "AI as new tool in banks' crime-fighting bag?", American Banker, Mar. 2018, 8 pp.
Aung, "Operational Risk Management Framework for Service Outsourcing: Consideration of Risk Dimensions and Their Application Into the Framework," International Journal of Electronic Business Management, vol. 6, No. 3, 2008, 11 pp.
Grigoroudis et al. "A survey of customer satisfaction barometers: Some results from the transportation-communications sector", European Journal of Operational Research, vol. 152, Issue 2, Jan. 16, 2004, pp. 334-353.
Prosecution History from U.S. Appl. No. 16/710,289, dated Feb. 2, 2022 through Dec. 8, 2022, 56 pp.
Rahim, "Perceived Operational Risk Management and Customer Complaints in Malaysian Conventional Banking Industry" Advanced Science Letters, vol. 21, No. 4, Apr. 2015, 6 pp.
U.S. Appl. No. 16/447,567, filed Jun. 20, 2019, naming inventors Johnson et al.
U.S. Appl. No. 16/710,289, filed Dec. 11, 2019, naming inventors Johnson et al.
U.S. Appl. No. 17/099,674, filed Nov. 16, 2020, naming inventors Bowers et al.
Yusof et al., "Intrusion alert correlation technique analysis for heterogeneous log", IJCSNS International Journal of Computer Science and Network Security, vol. 8, No. 9, Sep. 2008, pp. 132-138.
Office Action from U.S. Appl. No. 16/710,289 dated Jun. 28, 2023, 15 pp.
Final Office Action from U.S. Appl. No. 16/710,289 dated Nov. 14, 2023, 14 pp.
Response to Office Action dated Nov. 14, 2023 from U.S. Appl. No. 16/710,289, filed Jan. 16, 2024, 16 pp.
Advisory Action from U.S. Appl. No. 16/710,289 dated Feb. 22, 2024, 3 pp.
Notice of Allowance from U.S. Appl. No. 16/710,289 dated Sep. 24, 2024, 13 pp.
Office Action from U.S. Appl. No. 16/710,289 dated Apr. 23, 2024, 13 pp.
Response to Office Action dated Apr. 23, 2024 from U.S. Appl. No. 16/710,289, filed Jul. 23, 2024, 17 pp.

* cited by examiner

COMPUTER SYSTEMS FOR ANALYZING AND PRESENTING ALERT-BASED INFORMATION

This application is a divisional filing of U.S. patent application Ser. No. 16/710,289, filed 11 Dec. 2019, the entire contents of which is incorporated herein by reference.

TECHNICAL FIELD

This disclosure relates to computer systems that analyze and present data.

BACKGROUND

In various industries and processes, customers and other actors tend to act within a range of expected behaviors. In some cases, actions outside of the range of expected behaviors can be seen as anomalous, which may indicate potentially risky behavior. That is, when an actor takes an action that is not within the range of expected behaviors, the action may indicate that the actor is acting outside of operational guidelines. Thus, management may want to further analyze the actor and/or the action to determine whether corrective action and/or training is warranted. In some industries, e.g., the banking industry, certain operational risks must be resolved according to industry standards or regulations. To help users address potential risks, computer systems may output alerts that flag actors and/or actions for review.

SUMMARY

In general, this disclosure describes computer systems for analyzing and presenting alert-based information for an enterprise business. In particular, a central device (e.g., a server) in a computer system of the enterprise business receives alerts from other devices associated with different office branches of the enterprise business, and analyzes the alerts on a periodic schedule (e.g., weekly, monthly, quarterly, yearly, or any other interval of time). For example, every month, the central device may calculate a weighted alert volume by district based on the risk scores calculated for the office branches within the district, calculate an average weighted alert volume across the entire enterprise, and calculate the standard deviation of the average weighted alert volume to determine the alert risk rating for the district. The alert risk rating for a given district may be high, medium, or low compared to the average weighted alert volume. The central device may further analyze the dispositions of the alerts on the period schedule. For example, the central device may determine coaching rates (e.g., the rate at which coaching or training is performed) and/or disposition rates (e.g., the rate at which alerts are resolved) by district. The central device may further output the alert and/or disposition information to users in a simple format that enables the users to quickly compare regions, districts, or branches identify issues, trends, and/or training opportunities for particular branches, districts, or regions.

In one example, this disclosure is directed to a method including receiving, by a processor implemented in circuitry, a plurality of alerts, each alert of the plurality of alerts representing a type of abnormal behavior for an enterprise business comprising a plurality of districts; calculating, by the processor, an alert volume for a period of time for each district of the plurality of districts of the enterprise business; calculating, by the processor, an average alert volume during the period of time for the enterprise business; calculating, by the processor, a standard deviation of the average alert volume during the period of time for the enterprise business; assigning, by the processing, a respective risk rating to each respective district of the plurality of districts based on a comparison between the respective alert volume corresponding to the respective district and the average alert volume and the standard deviation for the enterprise business; and outputting, by the processing, data representative of each respective alert volume corresponding to each respective district, the average alert volume, and the standard deviation, wherein the data representative respective alert volume includes an indication of the respective risk rating for the corresponding respective district.

In another example, this disclosure is directed to a method including receiving, by a processor implemented in circuitry, a plurality of alerts, each alert of the plurality of alerts representing a type of abnormal behavior for an enterprise business comprising a plurality of districts; calculating, by the processor, an alert volume for a period of time by district of the plurality of districts; determining, by the processor, dispositions for each alert of the plurality of alerts resolved during a first period of time; determining, by the processor, disposition information including calculating a respective coaching rate and a respective on-time disposition rate for each of the plurality of districts based on the dispositions for each alert of the plurality of alerts and the alert volume for each respective district; and outputting, by the processor, data representative of the disposition information for the plurality of alerts.

In another example, this disclosure is directed to a device including a processor implemented in circuitry and configured to: receive a plurality of alerts, each alert of the plurality of alerts representing a type of abnormal behavior for an enterprise business comprising a plurality of districts; calculate an alert volume for a period of time for each district of the plurality of districts of the enterprise business; calculate an average alert volume during the period of time for the enterprise business; calculate a standard deviation of the average alert volume during the period of time for the enterprise business; assign a respective risk rating to each respective district of the plurality of districts based on a comparison between the respective alert volume corresponding to the respective district and the average alert volume and the standard deviation for the enterprise business; and output data representative of each respective alert volume corresponding to each respective district, the average alert volume, and the standard deviation, wherein the data representative respective alert volume includes an indication of the respective risk rating for the corresponding respective district.

In another example, this disclosure is directed to a device including a processor implemented in circuitry and configured to: receive a plurality of alerts, each alert of the plurality of alerts representing a type of abnormal behavior for an enterprise business comprising a plurality of districts; calculate an alert volume for a period of time by district of the plurality of districts; determine dispositions for each alert of the plurality of alerts resolved during a first period of time; determine disposition information including calculating a respective coaching rate and a respective on-time disposition rate for each of the plurality of districts based on the dispositions for each alert of the plurality of alerts and the alert volume for each respective district; and output data representative of the disposition information for the plurality of alerts.

The details of one or more examples are set forth in the accompanying drawings and the description below. Other features, objects, and advantages will be apparent from the description and drawings, and from the claims.

DETAILED DESCRIPTION

Figure 1:
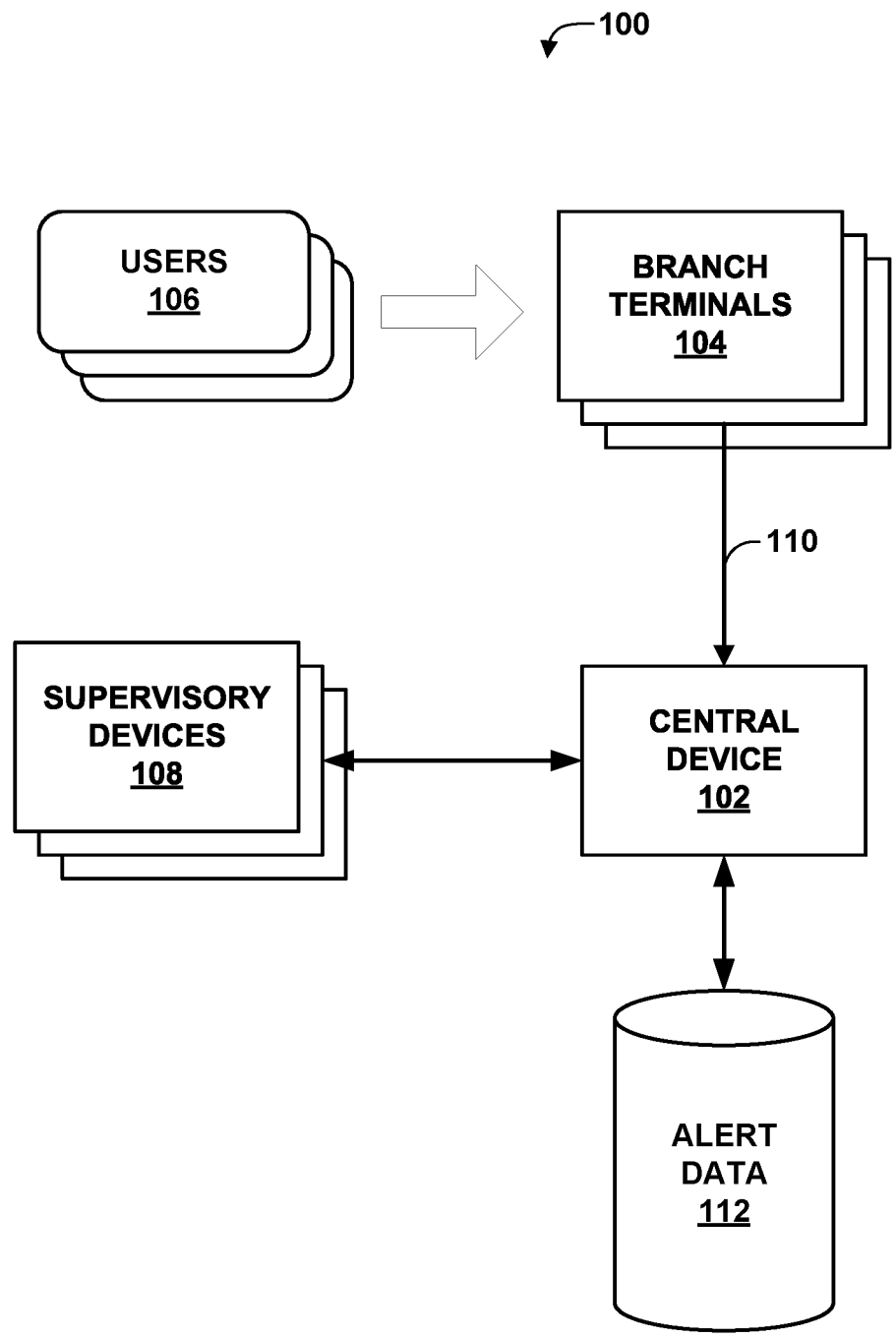
FIG. 1 is a block diagram illustrating an example computing system configured to analyze and present alert-based information according to the techniques of this disclosure.

FIG. 1 is a block diagram illustrating an example computing system 100 that may analyze and present alert-based information according to the techniques of this disclosure. In particular, system 100 includes branch terminals 104, central device 102, and supervisory devices 108. Branch terminals 104 represent examples of various types of computers that may be used by users 106, e.g., for performing tasks for customers. Central device 102 represents an example of a central system of record that receives alerts 110 and, according to the techniques of this disclosure, periodically analyzes the alerts 110 received during a period time and outputs information about alerts 110 and/or their dispositions for display at supervisory devices 108.

In general, users 106 (who may be employees at a branch of a business enterprise, such as a bank or other office) may assist customers with various transactions. For example, for a bank, a customer may open an account, deposit or withdraw funds to or from an account, open a line of credit or credit card, close an account, or the like. In some instances, users 106 may determine that a transaction performed by or on behalf a customer or potential customer represents an anomalous or abnormal behavior. For instance, not funding a new checking or savings account within a certain period of time (e.g., 1 day, 5 days), not providing signatures or other information on an application (e.g., phone number, email), performing a transaction that overdraws an account, opening and closing an account on the same day, or other such abnormal behaviors may merit additional attention. In response, one of users 106 may issue one of alerts 110 via a respective one of branch terminals 104 to central device 102. In some examples, users 106 may issue alerts to central device 102 using respective branch terminals 104 via an enterprise access portal. In some examples, alerts may be issued automatically by branch terminals 104 or central device 102.

Central device 102, according to the techniques of this disclosure, may periodically (e.g., weekly, monthly, quarterly, or any other interval of time) analyze alerts 110 received from branch terminals 104 during a period of time (e.g., during the week, month, quarter, or since the last time central device 102 analyzed alerts 110). For example, central device 102 may calculate the alert volume of the alerts received during the period of time for each district of the enterprise business, the average alert volume of the alerts received during the period of time across the entire enterprise business, and/or the standard deviation of the average alert volume. In some examples, central device 102 may calculate the alert volume of the alerts received during the period of time for each branch or region, which would include one or more branches in a city, county, state, country, or any other geographic area. In some examples, the alert volume may only account for the alerts resolved during the period of time. For example, if central device 102 analyzes alerts 110 every month, the alert volume would only account for the alerts that were resolved during the previous month (i.e., the month being analyzed). In some examples, the central device 102 may also determine and assign an alert risk rating to each branch, district, or region. For example, central device 102 may assign a high, medium, or low risk rating to each branch, district, or region based on a comparison between alert volume for each branch, district, or region and the average alert volume and/or the standard deviation of the average alert volume for the enterprise business.

In some examples, the alert volume may be a weighed alert volume. To calculate the weighted alert volume, central device 102 may calculate a weighted alert score for each alert received during the period of time and total (e.g., sum up) those weighted alert scores for the period of time. For example, central device 102 may use a domain knowledge score and/or a machine knowledge score to calculate each weighted alert score. The knowledge score may be an objective evaluation of risk for various alerts of abnormal user behaviors provided by risk subject matter experts. The machine knowledge score may represent a percent of previously closed alerts having a positive disposition, e.g., a disposition other than "no findings." That is, the machine knowledge score represents the number of previously analyzed alerts for which some further action was required, i.e., positive alerts as opposed to false positive alerts. In some examples, the machine knowledge alert is determined from previous alerts of the same type as the alert currently being analyzed. To calculate the weighted alert score, central device 102 may weight the domain knowledge score and/or the machine knowledge score with respective weights, e.g., a domain weight and a machine weight, respectively, and use the weighted domain knowledge, the weighted machine knowledge, or the sum of the weighted domain knowledge and the weighted machine knowledge as the weighted alert score. Further example, details of calculating a weighted alert score (or risk score) can be found in U.S. patent application Ser. No. 16/447,567, filed Jun. 20, 2019 and entitled "AUTOMATICALLY ASSESSING ALERT RISK LEVEL", which is incorporated herein by reference in its entirety. Central device 102 may then total the weighted alert scores of the alerts received during a period of time (e.g., for a branch, a district, region, or the entire enterprise business)

to calculate the weighted alert volume (e.g., for a branch, a district, region, or the entire enterprise business, respectively).

Central device 102 may also analyze the dispositions of alerts 110 received from branch terminals 104 and/or resolved during a period of time (e.g., during the week, month, quarter, or since the last time central device 102 analyzed alerts 110). For example, central device 102 may determine (e.g., identify) the disposition for each of alerts 110 resolved during a period of time (e.g., during a week, month, quarter, or since the last time central device 102 analyzed alerts 110). A disposition may be a positive disposition or a negative disposition. A positive disposition may include coaching (or training) and/or any other corrective action and a negative disposition may be "no findings" or a false positive. For example, the corrective action may be to forward the alert to an administrator or a supervisor, to issue data to one of branch terminals 104 to prevent or reverse a particular action (e.g., close an account or prevent an account from opening, prevent a transaction from occurring on an account, or the like), or other such actions. In some examples, central device 102 may also determine whether or not the alert was resolved "on time". For example, the issue(s) identified by an alert may be resolved "on time" if resolved by or within a period of time defined by a service level agreement (SLA), industry standards, regulations, and the like.

Central device 102 may store alerts 110 and alert analysis information in alert data database 112. For example, central device 102 may store each respective alert volume corresponding to each respective branch, district, and/or region; the average alert volume; the standard deviation; and disposition information for each alert in alert data database 112. In some examples, central device 102 may also store a respective risk rating for each branch, district and/or region in alert data database 112. In some examples, central device 102 may store the alert analysis information in a separate database from alerts. In some examples, central device 102 may store alerts 110 and/or the alert analysis information in local memory.

Supervisors, management, leadership, or other enterprise business employees (not shown) may request alert analysis information from central device 102 for a particular time period (e.g., for a particular week, month, quarter, or any other period) via supervisory devices 108. Central device 102 may output or transmit data representative of the alert analysis information from alert data database 112 for display at supervisory devices 108, as described in further detail below. In some examples, the alert analysis information may be transmitted in XML format. In some examples, the user may only request and/or receive alert analysis information based on his or her seniority level. For example, a branch manager may only be allowed to request or receive alert analysis information for that manager's corresponding branch, district or region.

In this manner, the techniques performed by central device 102 may generally improve performance of central device 102, branch terminals 104, supervisory devices 108, and system 100, as well as other similar systems, thereby improving the field of alert analysis. For example, computer-based alert systems can produce high volumes of alerts that can be difficult to quickly parse and understand. Techniques in accordance with this disclosure can improve the analysis of voluminous alerts by presenting easily understood data from alert data database 112 to supervisors, management, leadership, or other enterprise business employees. In this way, enterprise business leadership may compare alert and disposition information from similar branches, districts, or regions and easily identify issues, trends, and/or training opportunities for particular branches, districts, or regions. For example, being able to quickly compare information reduces power consumption.

Figure 2:
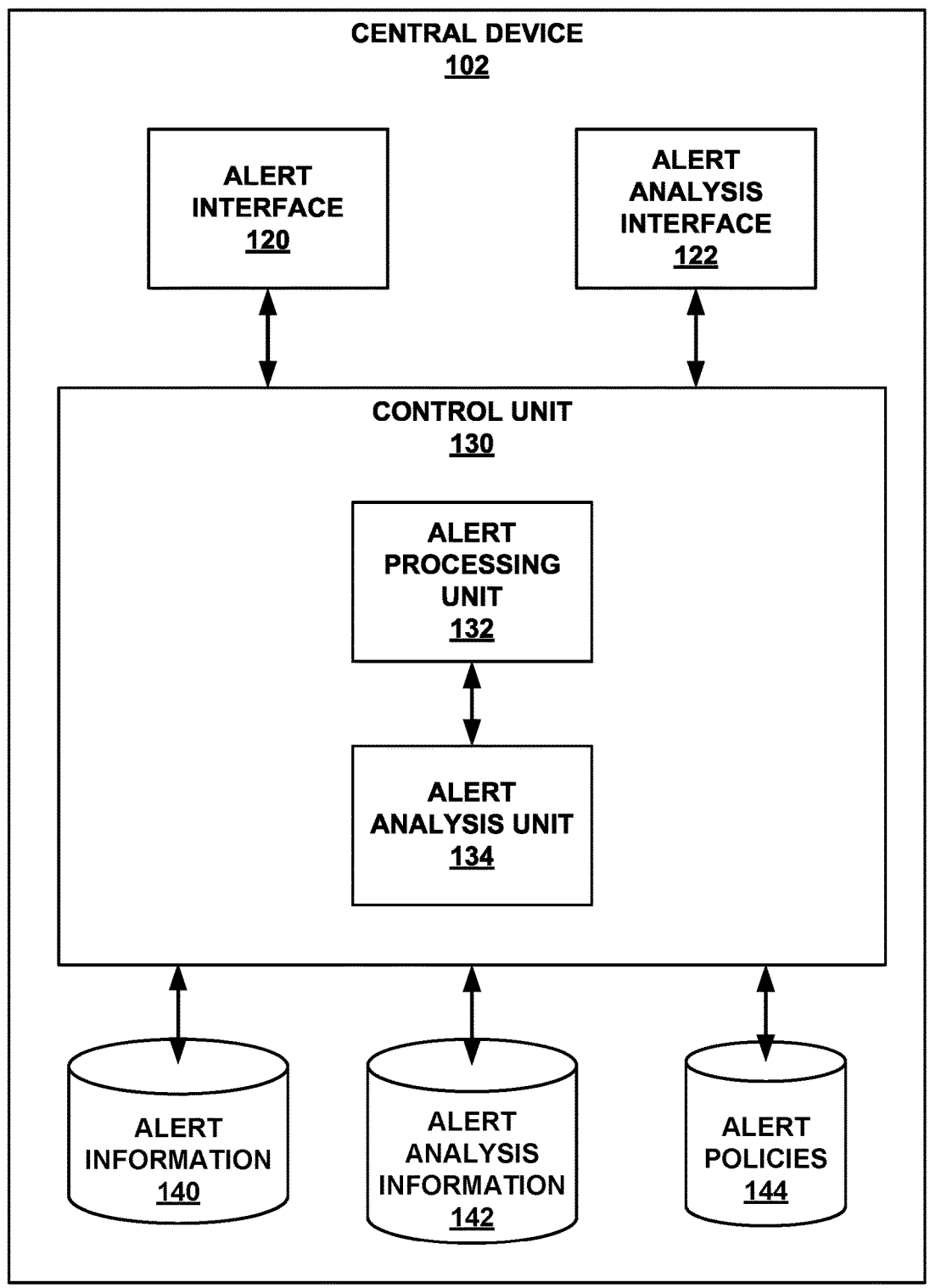
FIG. 2 is a block diagram illustrating an example set of components of a central device configured to perform the techniques of this disclosure.

FIG. 2 is a block diagram illustrating an example set of components of central device 102 of FIG. 1, which may be configured to perform the techniques of this disclosure. In the example of FIG. 2, central device 102 includes alert interface 120, control unit 130, alert information database 140, alert analysis information database 142, and alert policies database 144. Control unit 130 further includes alert processing unit 132 and alert analysis unit 134.

Alert information database 140, alert analysis information database 142, and alert policies database 144 represent one or more respective computer-readable storage media, which may be included within central device 102 as shown in the example of FIG. 2. Alternatively, one or more of alert information database 140, alert analysis information database 142, and alert policies database 144 may be stored in a remote device to which central device 102 may be communicatively coupled (e.g., alert data database 112 of FIG. 1). The computer-readable storage media may be one or more of a hard disk, a flash drive, random access memory (RAM), or other such computer-readable storage media.

Alert interface 120 and alert analysis interface 122 represent interfaces for receiving alerts and for receiving requests for and providing analytical data of alerts (including dispositions), respectively. For example, alert interface 120 and alert analysis interface 122 may represent one or more of a network interface, user interfaces (e.g., a keyboard, mouse, touchscreen, command line interface, graphical user interface (GUI), or the like), monitors or other display devices, or other such interfaces for receiving input from and providing output to users and other computing devices either directly or remotely. In accordance with the techniques of this disclosure, central device 102 receives alerts 110 from branch terminals 104 of FIG. 1 via alert interface 120. Likewise, central device 102 may receive requests for alert analytics and provide data representing such analytics via alert analysis interface 122.

Control unit 130 represents one or more hardware-based processing units implemented in circuitry. For example, control unit 130 and the components thereof (e.g., alert processing unit 132, and alert analysis unit 134) may represent any of one or more processing units, such as microprocessors, digital signal processors (DSPs), field programmable gate arrays (FPGAs), application specific integrated circuits (ASICs), or other such fixed function and/or programmable processing elements. Control unit 130 may further include a memory for storing software and/or firmware instructions to be executed by the processing units thereof. Thus, the functionality of control unit 130, alert processing unit 132, and alert analysis unit 134 may be implemented in any combination of hardware, software, and/or firmware, where software and firmware instructions may be executed by hardware-based processing units implemented in circuitry.

In accordance with the techniques of this disclosure, alert processing unit 132 stores alert information in alert information database 140. For example, alert processing unit 132 may store the type of alert, a client behavior or action that triggered the alert, date of issuance, issuing entity (e.g., user 106 or branch terminal 104), the employee(s) involved, and/or whether the alert is positive alert of a false positive in alert information database 140. If the alert is a positive alert, alert processing unit 132 may store the disposition, date of disposition, and/or duration of time from issuance to disposition in alert information database 140. If the alert is a false positive alert, alert processing unit 132 may store a "no findings" disposition for the alert in alert information database 142.

In accordance with the techniques of this disclosure, alert analysis unit 134 may periodically (e.g., weekly, monthly, quarterly, or any other interval of time) analyze the alerts received via alert interface 120 and/or resolved during a period of time (e.g., during the week, month, quarter, or since the last time alert analysis unit 134 analyzed alerts). For example, alert analysis unit 134 may calculate the alert volume of the alerts received during the period of time for each district of the enterprise business, the average alert volume of the alerts received during the period of time across the entire enterprise business, and/or the standard deviation of the average alert volume. In some examples, alert analysis unit 134 may calculate the alert volume of the alerts received during the period of time for each branch or region. In some examples, the alert volume may only account for the alerts resolved during the period of time. For example, if alert analysis unit 134 analyzes alerts monthly, the alert volume would only account for the alerts that were resolved during the previous month (i.e., the month being analyzed).

In some examples, the alert analysis unit 134 may also determine and assign an alert risk rating for each branch, district, or region. For example, alert analysis unit 134 may assign a high, medium, or low risk rating to each branch, district, or region based on a comparison between alert volume for each branch, district, or region and the average alert volume and/or the standard deviation of the average alert volume for the enterprise business. In some examples, the alert volume may be a weighed alert volume (e.g., as described above with reference to FIG. 1). Alert analysis unit 134 may also calculate a respective alert volume for each type of alerts received during the period of time and determine a number of alerts with the highest alert volume during the period of time. For example, alert analysis unit 134 may determine the top five alerts by name during the period of time and store the names of these top driver alerts and their respective alert volumes in alert analysis information 142.

Alert analysis unit 134 may also analyze the dispositions of the alerts received and/or resolved during a period of time. For example, alert analysis unit 134 may determine (e.g., identify) the disposition for each of the alerts resolved during the period of time being analyzed. In some examples, central device 102 may also determine whether or not the alert was resolved "on time". For example, the issue(s) identified by an alert may be resolved "on time" if resolved by or within a period of time defined by alert policies database 144, which may include a SLA, industry standards, regulations, and the like. In some examples, alert analysis unit 134 may also determine a disposition rate (or on-time disposition rate) for a branch, district, region, or enterprise business. The disposition rate may be the number of alerts resolved "on time" divided the total volume of alerts for a given period of time. Alert analysis unit 134 may also determine that a branch, district, region, or enterprise business is operating within standards based on whether the disposition rate for that a branch, district, region, or enterprise business is equal to or above a disposition rate threshold (e.g., 90%) as defined in alert policies database 134. Conversely, alert analysis unit 134 may determine that a branch, district, region, or enterprise business needs attention if the disposition rate for that that a branch, district, region, or enterprise business less than the disposition rate threshold (e.g., 90%) as defined in alert policies database 134.

Alert analysis unit 134 may store the alert analysis information in alert analysis information database 142. For example, alert analysis unit 134 may store each respective alert volume corresponding to each respective branch, district, and/or region; the average alert volume; the standard deviation; and disposition information for each alert in alert analysis information database 142. In some examples, the alert analysis information may also include a respective risk rating for each branch, district and/or region.

Central device 102 may receive requests for alert analytics and provide data representing such analytics via alert analysis interface 122. For example, supervisors, management, leadership, or other enterprise business employees may request alert information and/or alert analysis information stored in alert information database 140 and alert analysis information database 142, respectively, for a particular time period (e.g., for a particular week, month, quarter, or any other period). In response, central device 102 may output data representative of the alert analysis information from alert information database 140 and/or alert analysis information database 142 for display at one or more computing devices (e.g., supervisory devices 108). In this way, supervisors, management, leadership, or other enterprise business employees may compare alerts issued by users, branches, districts, regions, or the like to each other, and easily detect trends in alerts, identify outliers among peer groups regarding alerts, or the like, e.g., to determine whether additional training should be provided to members of certain branches, districts, or regions. In some examples, the branches, districts, or regions compared may be of similar size and/or activity.

Figure 3:
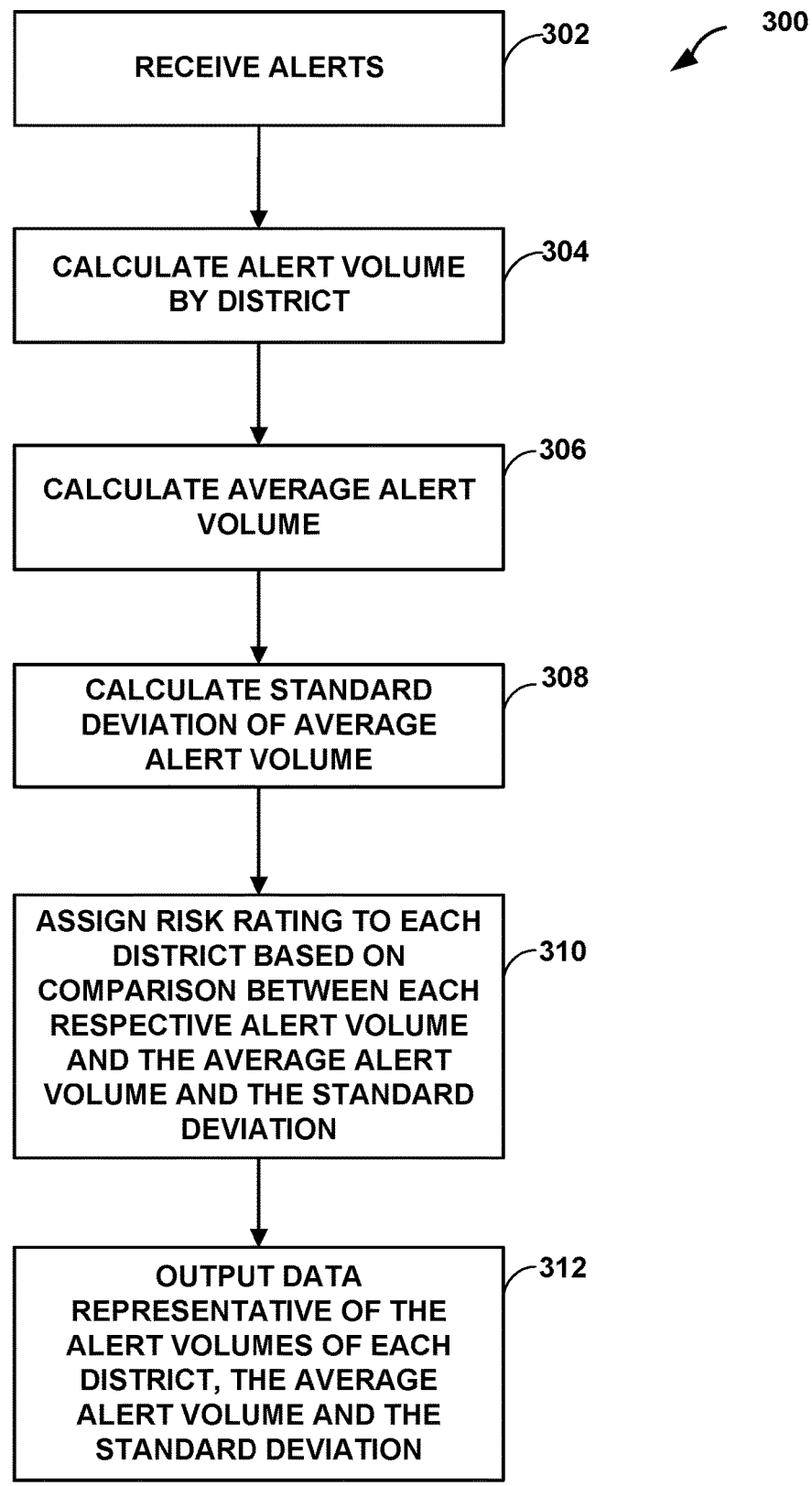
FIG. 3 is a flowchart illustrating an example method of analyzing alert volume by district according to the techniques of this disclosure.

FIG. 3 is a flowchart 300 illustrating an example method of analyzing alert volume by district according to the techniques of this disclosure. For purposes of example and explanation, the method of FIG. 3 is explained with respect to central device 102 of FIGS. 1 and 2. However, it should be understood that other computer devices may be configured to perform this or a similar method.

Initially, central device 102 receives alerts via alert interface 120 (302). For example, central device 102 may receive alerts during a period of time (e.g., a week, a month, a quarter, a year) and store the alerts (e.g., in alert data database 112 of FIG. 1 and/or alert information database 140 of FIG. 2). After the period of time, control unit 130 of central device 102 may calculate an alert volume for the alerts received during the period of time corresponding to each district (304). In some examples, control unit 130 may calculate a weighted alert volume for each district (e.g., as described above with reference to FIG. 1). Control unit 130 may also calculate the average alert volume for the alerts received during the period of time for the entire enterprise business (306). Next, control unit may calculate the standard deviation of the average alert volume for enterprise business (308).

Based on the alert volume for each district, the average alert volume for the period of time, and the standard deviation of the average volume, control unit 130 may assign a respective risk rating to each district (310). For example, control unit 130 may assign a low risk rating to the districts with respective alert volumes below the average alert volume for the business enterprise for the period of time, assign a moderate risk rating to districts with respective alert volumes equal to or above the average alert volume for the business enterprise for the period of time and below the standard deviation of the average alert volume for the business enterprise for the period of time, and assign a high risk rating to the districts with respective alert volumes equal to or above the standard deviation of the average alert volume for the business enterprise for the period of time.

Control unit 130 may output data representative of the respective alert volumes for each district, the average alert volume for the business enterprise, and the standard deviation of the average alert volume for the business enterprise for a particular period of time (312). For example, central device 102 may receive requests for alert analytics via alert analysis interface 122 for the particular month and control unit 130 may, in response to the request, transmit, via alert analysis interface 122, the requested data for display at one or more computing devices (e.g., supervisory devices 108). In some examples, the data may be transmitted in XML format.

Figure 4:
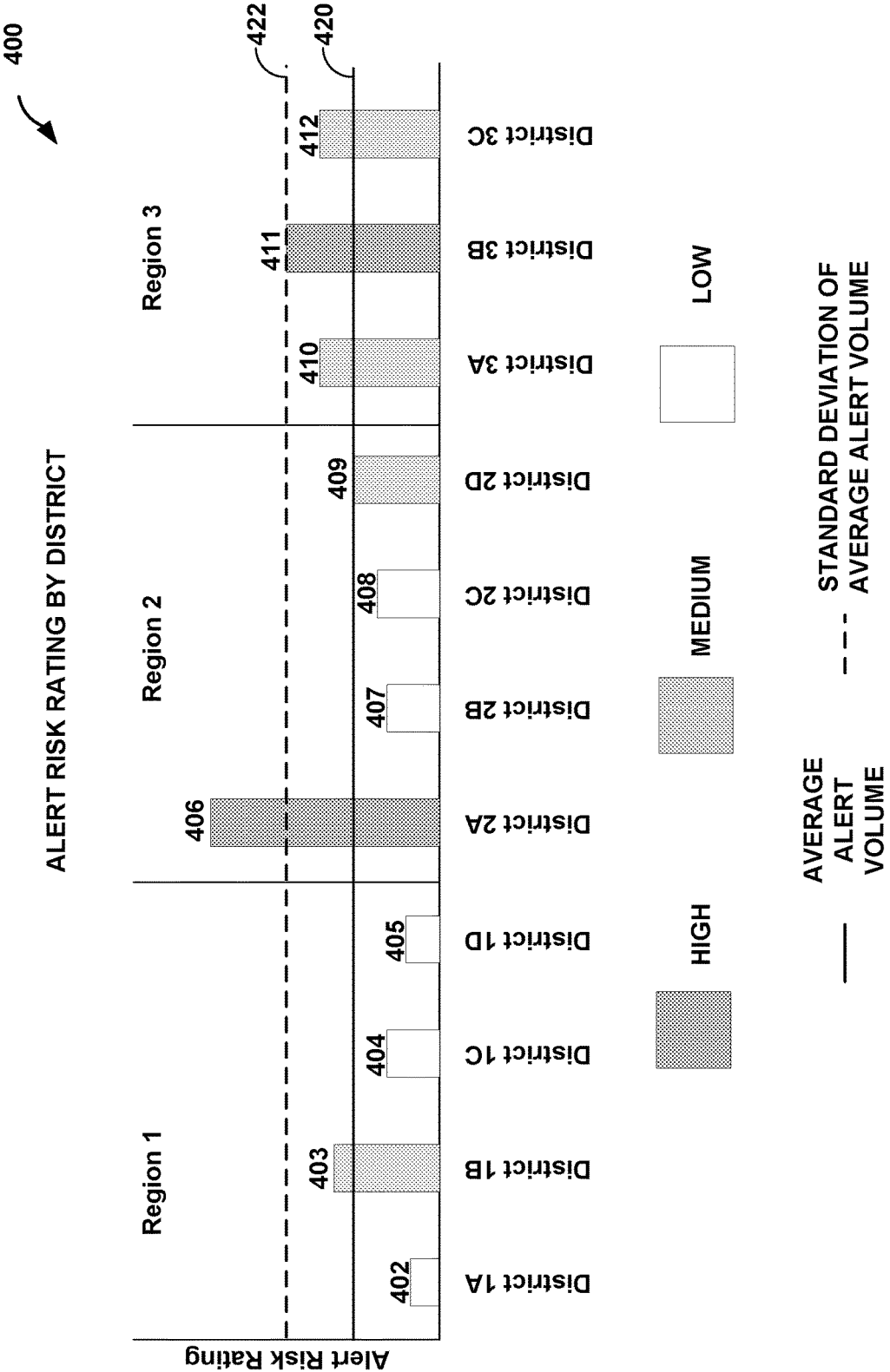
FIG. 4 is a graph illustrating example alert risk ratings by district according to the techniques of this disclosure.

FIG. 4 is a graph 400 illustrating example alert risk ratings by district according to the techniques of this disclosure. Graph 400 represents exemplary data outputted by central device 102 and/or presented by supervisory devices 108. However, it should be understood that other computer devices may be configured to output or present such data.

In this example, the business enterprise includes three regions and a plurality of districts within each region. For example, Region 1 includes Districts 1A-1D, Region 2 includes Districts 2A-2D, and Region 3 includes Districts 3A-3C. The graph includes bars 402-412 corresponding to the respective alert volume for each district, line 420 representing the average alert volume for the business enterprise for a particular period of time, and line 422 representing the standard deviation of the average alert volume for the business enterprise for the same particular period of time. Bars 402-412 are color coded to illustrate the respective risk rating for each district. For example, Districts 1A, 1C, 1D, 2B, and 2C all have a low risk rating (e.g., represented by a first color) for the time period shown because each of their respective alert volumes (e.g., represented by bars 402, 404, 405, 407, and 408) are below the average alert volume for the business enterprise (e.g., below line 420), Districts 1B, 2D, 3A, and 3C have a medium (or moderate) risk rating (e.g., represented by a second color, different than the first color) for the time period shown because their respective alert volumes (e.g., represented by bars 403, 409, 410, and 412) are equal to or above the average alert volume for the business enterprise (e.g., at or above line 420) and below the standard deviation of the average alert volume for the business enterprise (e.g., below line 422), and Districts 2A and 3B have a high risk rating (e.g., represented by a third color, different than the first and second colors) for the time period shown because their respective alert volumes (e.g., represented by bars 406 and 411) are equal to or above the standard deviation of the average alert volume for the business enterprise for the time period shown (e.g., equal to or above line 422). In this way, a user (e.g., supervisors, management, leadership, or other enterprise business employees) may compare districts to each other and easily identify districts or regions that need attention or additional training. In some examples, graph 400 does not show numerical values for alert volumes, the average alert volume, and/or standard deviation of the average alert volume, as shown in FIG. 4. In some examples, each of bars 402-412 are selectable. In response to a user selecting one of bars 402-412, additional data representative of a breakdown of the selected alert volume may be presented (e.g., a rundown of the composition of alert categories that make up an alert volume), as shown in FIG. 5.

Figure 5:
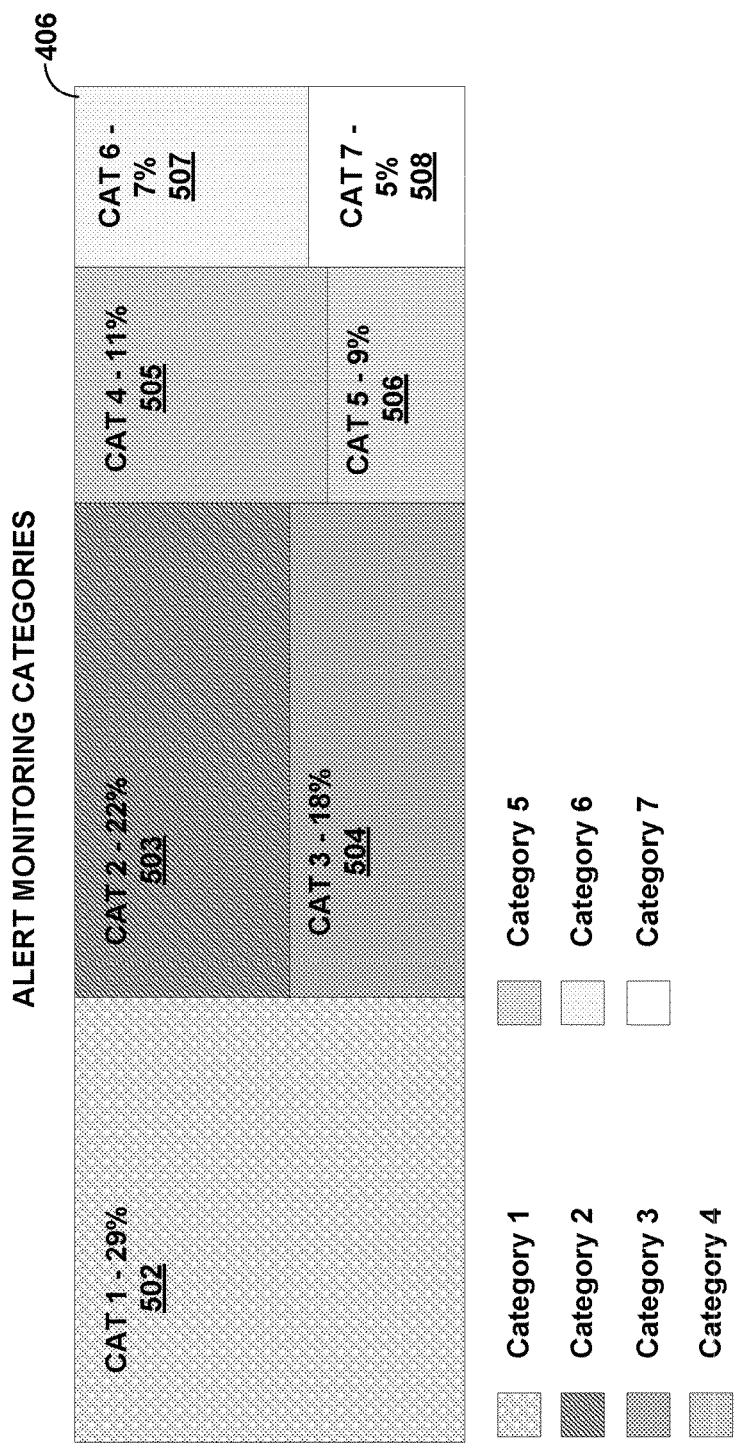
FIG. 5 is a graph illustrating an example breakdown of the alert monitoring categories that make up an alert volume of FIG. 4 according to the techniques of this disclosure.

FIG. 5 is a graph 500 illustrating an example breakdown of the alert monitoring categories that make up an alert volume of FIG. 4 according to the techniques of this disclosure. Graph 500 may represent a breakdown of alert volume 406 corresponding to District 2A of FIG. 4. In some examples, graph 500 represents data presented by supervisory devices 108. However, it should be understood that other computer devices may be configured to present such data. In some examples, the data shown in graph 500 may have been transmitted to supervisory devices 108 with the data illustrated in FIG. 4. In this way, supervisory devices 108 need not request the additional data in response to a user selecting a respective alert volume from graph 400 of FIG. 4.

In the example shown in FIG. 5, the respective alert volume is comprised of alerts from seven different categories (e.g., Categories 1-7). Graph 500 includes shapes 502-508 with dimensions corresponding to the respective percentages of the monitoring categories that make up the represented alert volume (e.g., alert volume 406 of FIG. 4). For example, Category 1 makes up 29% percent of the alert volume 406 and is represented by shape 502 which has a larger surface area than shape 505 that represents Category 4, which makes up 11% of alert volume 606. Further, shapes 502-508 may be arranged in order from largest to smallest as shown in FIG. 5. In this way, a user may easily identify a monitoring category or categories that a particular district may be struggling with. This could help users identify potentially coaching or training opportunities. While only seven categories are shown in FIG. 5, it should be understood that alert volumes may comprise fewer or more categories. In some examples, each of shapes 502-508 are selectable. In response to a user selecting one of shapes 502-508, additional data regarding the alerts in the selected monitoring category may be presented, as shown in FIG. 6.

Figure 6:
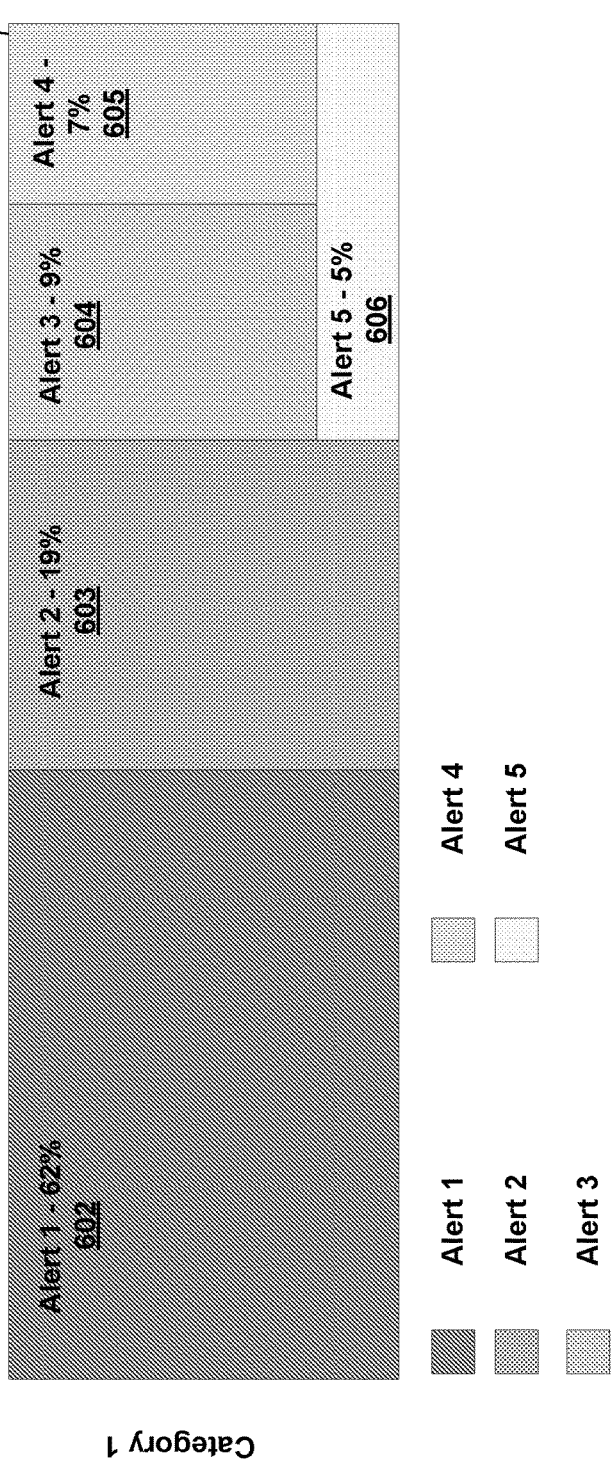
FIG. 6 is a graph illustrating example alerts in a monitoring category by alert name according to the techniques of this disclosure.

FIG. 6 is a graph 600 illustrating example alerts in a monitoring category from FIG. 5 by alert name according to the techniques of this disclosure. In some examples, graph 600 represents data presented by supervisory devices 108. However, it should be understood that other computer devices may be configured to present such data. In some examples, the data shown in graph 600 may have been transmitted to supervisory devices 108 with the data illustrated in FIG. 4. In this way, supervisory devices 108 need not request the additional data in response to a user selecting a respective monitoring category from graph 500 of FIG. 5.

Alerts may be grouped into monitoring categories. For example, account funding may be a category and can includes alerts indicating that an account is opened without being funded or not being funded with a period of time (e.g., a day, 5 days, or any other predetermined amount of time). In the example shown in FIG. 6, graph 600 represents a breakdown of the alerts that make up monitoring category 1 (e.g., shape 502 of FIG. 5). For example, graph 600 represents a breakdown (e.g., rundown or explanation of the composition) of the alerts by alert name of monitoring category 1. In particular, graph 600 shows that monitoring category 1 comprises 62% of Alert 1, 19% of Alert 2, 9% of Alert 3, 7% of Alert 4, and 5% of Alert 5.

Graph 600 includes shapes 602-606 with dimensions corresponding to the respective percentages of the alerts that make up the alert volume of the represented monitoring category (e.g., monitoring category 502). For example, Alert 1 makes up 62% percent of the alert volume of monitoring category 502 and is represented by shape 602 which has a larger surface area than shape 604 that represents Alert 3, which makes up 9% of alert volume of monitoring category

502. In this way, a user may easily identify an alert or alerts that a particular district may be struggling with. This could help users identify potentially coaching or training opportunities and specific topics. While only five alerts are shown in FIG. 6, it should be understood that monitoring categories may comprise fewer or more alerts.

Figure 7:
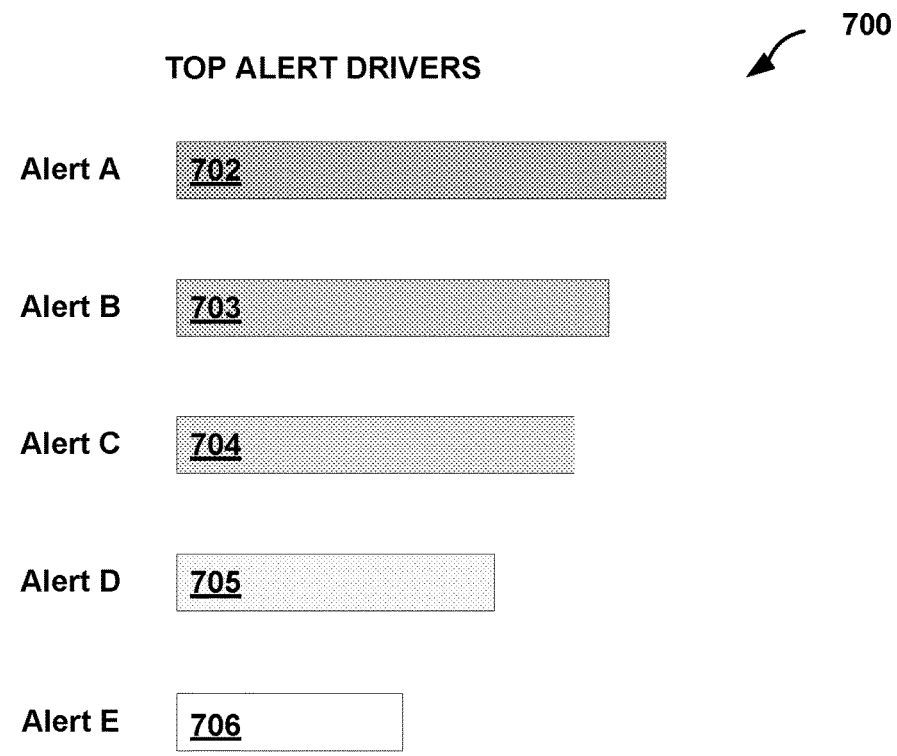
FIG. 7 is a graph illustrating example top risk drivers according to the techniques of this disclosure.

FIG. 7 is a graph 700 illustrating example top risk drivers according to the techniques of this disclosure. In some examples, graph 700 represents data presented by supervisory devices 108. However, it should be understood that other computer devices may be configured to present such data.

As shown in FIG. 7, graph 700 shows the five alerts by name with the highest alert volume during a particular period of time. In particular, graph 700 includes bars 702-706 representing the alert volume of Alerts A-E, respectively. In some examples, bars 702-706 may represent the weighted alert volume of Alerts A-E. In the example in FIG. 7, bars 702-706 may be ordered from the largest alert volume (e.g., bar 702) at the top to the smallest alert volume at the bottom (or vice versa). In some examples, bars 702-706 may be ordered from the largest alert volume (e.g., bar 702) on the left to the smallest alert volume to the right (or vice versa). While the top five alerts are shown in FIG. 7, it should be understood that fewer or more top alert drivers may be presented to a user.

Figure 8:
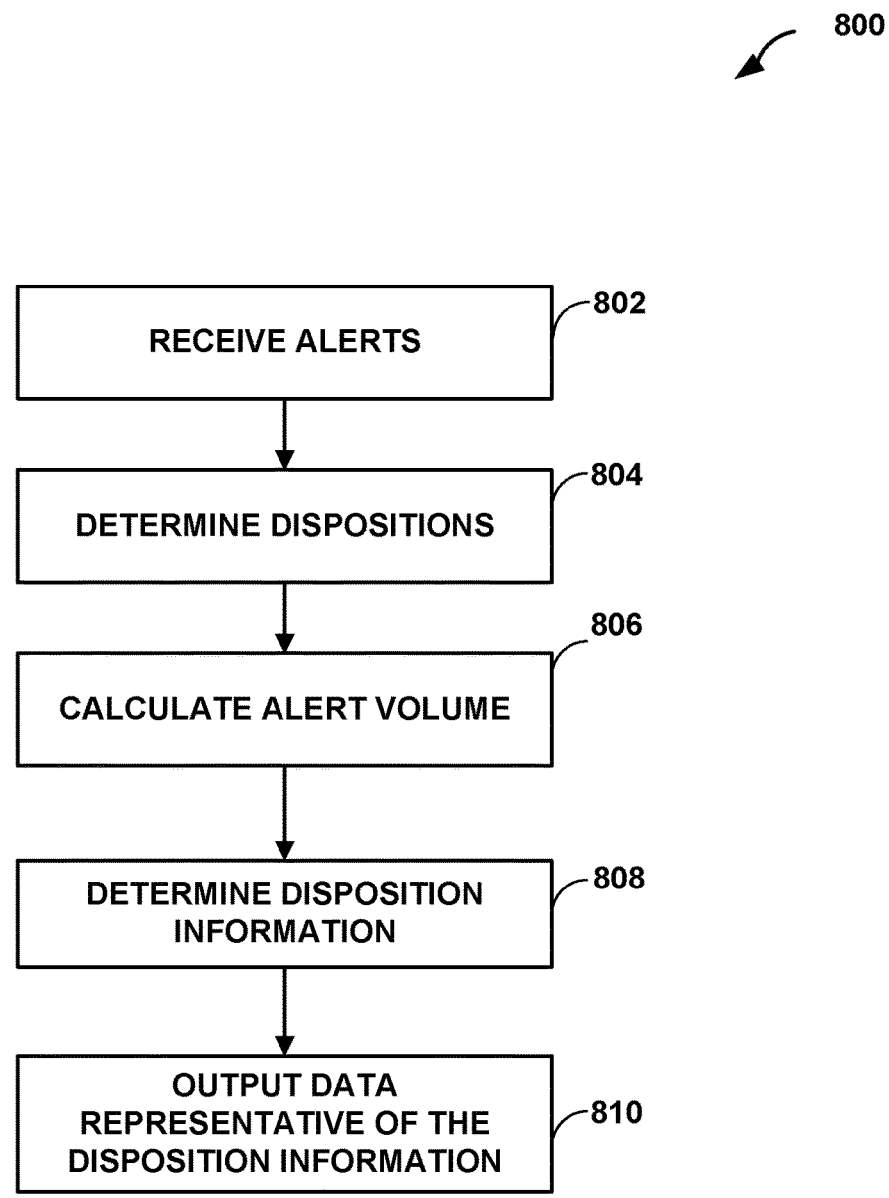
FIG. 8 is a flowchart illustrating an example method of analyzing alert disposition information according to the techniques of this disclosure.

FIG. 8 is a flowchart 800 illustrating an example method of analyzing alert disposition information according to the techniques of this disclosure. For purposes of example and explanation, the method of FIG. 8 is explained with respect to central device 102 of FIGS. 1 and 2. However, it should be understood that other computer devices may be configured to perform this or a similar method.

Initially, central device 102 receives alerts via alert interface 120 (802). For example, central device 102 may receive alerts and store the alerts (e.g., in alert data database 112 of FIG. 1 and/or alert information database 140 of FIG. 2). Control unit 130 may then determine the dispositions of the alerts resolved in a certain period of time (e.g., last week, month, quarter, or year) (804). The dispositions may include coaching (or training), resolved (e.g., through some sort of corrective action), or "no findings" (e.g., representing a false positive). Control unit 130 may also calculate the alert volume for each branch, district, region, or the entire enterprise business. In some examples, the alert volume may include all alerts resolved within a period of time defined by alert policies database 144, which may include a SLA, industry standards, regulations, and the like. In some examples, the alert volume may be a weighed alert volume (e.g., as described above with reference to FIG. 1).

Based on the dispositions and the alert volume(s), control unit 130 may determine disposition information (808). For example, control unit 130 may determine a respective coaching rate and a respective on-time disposition rate for each district of the enterprise business. In some examples, control unit 130 may determine the respective coaching rate for each district by dividing the number of alerts resolved with coaching during a period of time by the alert volume for each district. Similarly, control unit 130 may determine the respective on-time disposition rate for each district by dividing the number of alerts resolved on-time during a period of time by the alert volume for each district.

In some examples, control unit 130 may identify the districts with a high coaching rate, a moderate coaching rate, and a low coaching rate. For example, control unit 130 may divide the districts by respective coaching rate into thirds with the top third corresponding to a high coaching rate, the bottom third corresponding to a low coaching rate, and the middle third corresponding to the moderate coaching rate. In other examples, control unit 130 may cluster the districts into high coaching rate, a moderate coaching rate, and a low coaching rate using other clustering or grouping techniques (e.g., k-means clustering, mean-shift clustering, hierarchical clustering).

Control unit 130 may also identify the districts that are operating within standards based on whether the disposition rate is equal to or above a disposition rate threshold (e.g., 90%) as defined in alert policies database 134. Conversely, control unit 134 identify the districts that need attention based on whether the disposition rate is less than the disposition rate threshold (e.g., 90%) as defined in alert policies database 134. In some examples, control unit 130 may determine the coaching rate and the on-time disposition rate for each monitoring category by district. Control unit 130 may also determine the average coaching rate and the average on-time disposition rate across the entire enterprise business during the same period of time. In some examples, control unit 130 may determine the average coaching rate and the average on-time disposition rate for each monitoring category of the enterprise business.

In some examples, central device 102 may perform steps 804-808 periodically (e.g., weekly, monthly, quarterly, yearly, or any other regular period of time). Control unit 130 may output data representative of the disposition information (810). For example, central device 102 may receive requests for alert analytics and/or disposition information via alert analysis interface 122 for a particular time period (e.g., a particular month) and control unit 130 may, in response to the request, transmit, via alert analysis interface 122, the requested data for display at one or more computing devices (e.g., supervisory devices 108).

Figure 9B:
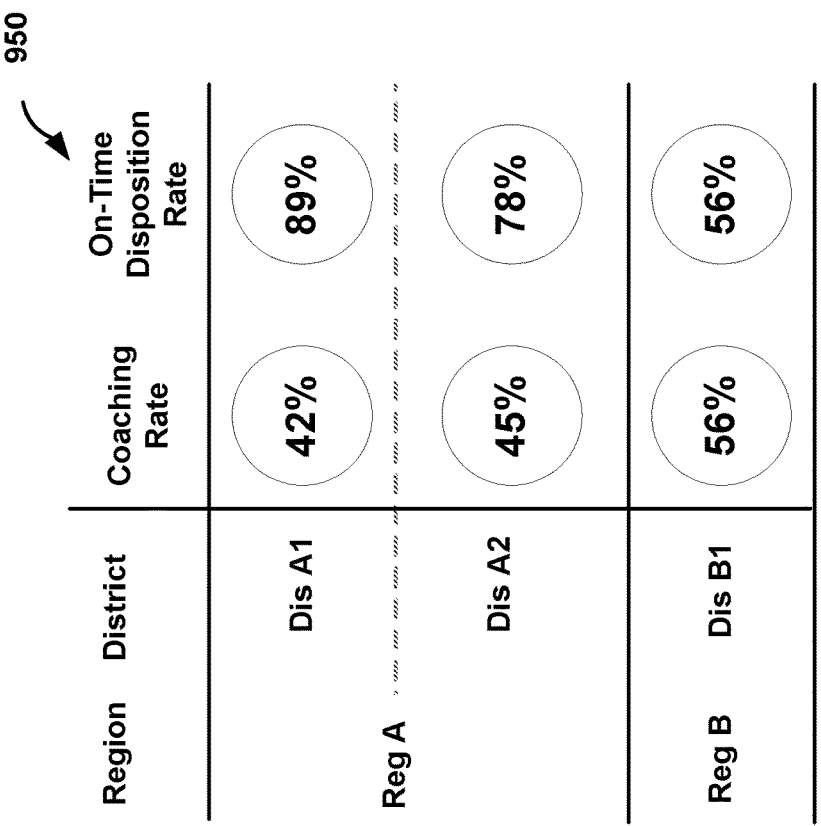
FIGS. 9A-9B are graphs illustrating example disposition information according to the techniques of this disclosure.
Figure 9A:
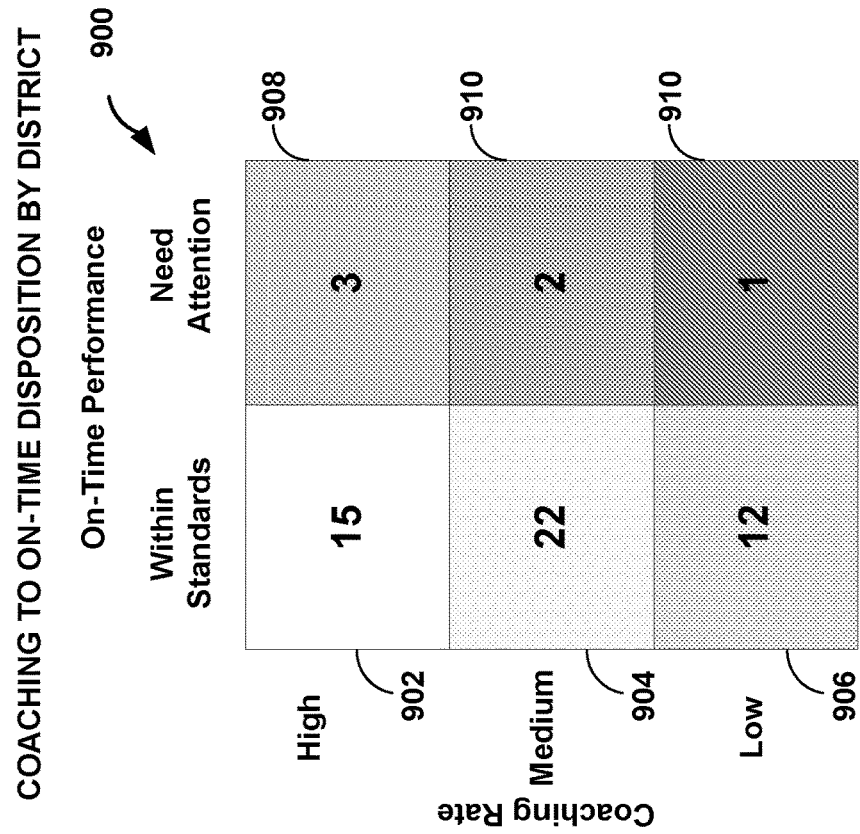

FIG. 9A is a graph 900 illustrating example disposition information according to the techniques of this disclosure. In particular, graph 900 illustrates the number of districts with high, medium (e.g., moderate), and low coaching rates under the "Coaching Rate" label and the number of districts with on-time disposition rates within standards or that need attention under the "On-Time Performance" label. For example, square 902 of graph 900 shows that fifteen districts are extremely active and have a high coaching rate and an on-time disposition rates within standards. For another example, square 910 of graph 900 shows that one district has a low coaching rate with an on-time disposition rate that needs attention, which suggests that management may need to intervene.

In some examples, each of squares 902-910 of FIG. 9A are selectable. In response to a user selecting one of squares 902-910, additional disposition information may be presented. In this way, enterprise business leadership may compare districts and/or identify poorly performing districts. For example, in response to a user selecting square 908, which shows that three districts have a high coaching rate with an on-time disposition rate that needs attention, a computing device (e.g., a supervising device 108) may present the additional disposition information shown in FIG. 9B. In particular, FIG. 9B illustrates graph 950 lists the three districts represented in square 908 of FIG. 9A (e.g., districts A1, A2, and B1). In this example, the corresponding region of the three districts are also presented (e.g., regions A and B). Graph 950 further includes the coaching rate and the on-time disposition rate for each of the districts represented in square 908 of FIG. 9A. In some examples, the data shown in graph 950 may have been transmitted to supervisory devices 108 with the data illustrated in FIG. 9A. In this way, supervisory devices 108 need not request the additional data in response to a user selecting a square from graph 900 of FIG. 9A. In some examples, the districts shown in FIG. 9B may be selectable. In response to a user selecting a district (e.g., the district name or any area in the row corresponding to the district), additional disposition information may be presented, as shown in FIG. 10A.

Figures 10A, 10B:
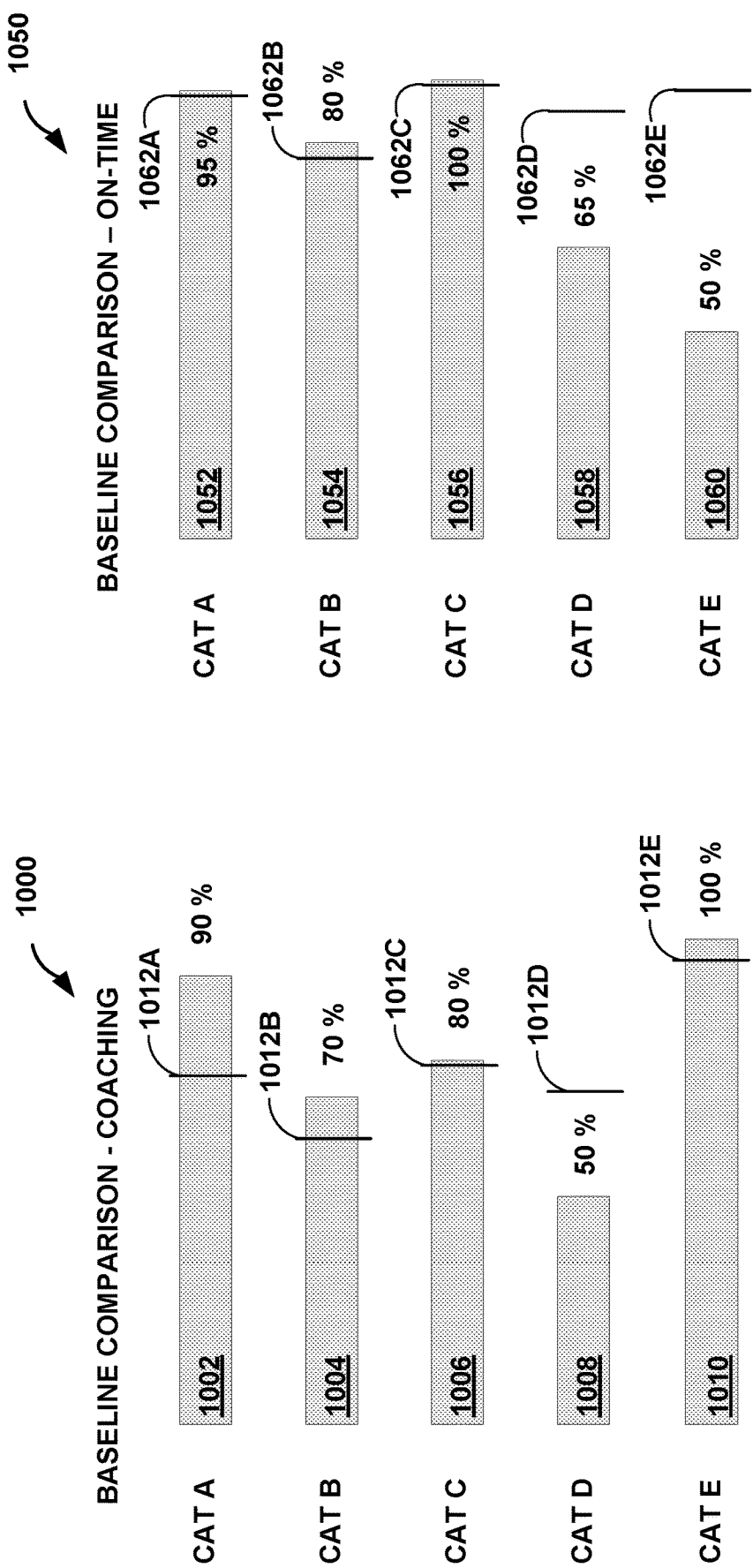
FIGS. 10A-10B are graphs illustrating example disposition information according to the techniques of this disclosure.

FIG. 10A is a graph 1000 illustrating example disposition information according to the techniques of this disclosure. In particular, graph 1000 illustrates coaching rate baseline comparisons by monitoring category. In some examples, graph 1000 represents data presented by supervisory devices 108. However, it should be understood that other computer devices may be configured to present such data. In some examples, the data shown in graph 1000 may have been transmitted to supervisory devices 108 with the data illustrated in FIG. 9B. In this way, supervisory devices 108 need not request the additional data in response to a user selecting a respective district from graph 950 of FIG. 9B.

As shown in FIG. 10A, graph 1000 shows five monitoring categories by name with the coaching rates corresponding to each monitoring category represented by bars 1002-1010. In some examples, coaching shown in FIG. 10A may correspond to a region, district, or branch. For example, the coaching rates shown in FIG. 10A may correspond to a district selected from graph 950 of FIG. 9B. Graph 1000 further shows lines 1012A-1012E corresponding to the respective baseline coaching rate for each monitoring category (collective, "baseline coaching rates 1012"). In some examples, the baseline coaching rates 1012 may be the average coaching rate for the entire business enterprise for the corresponding monitoring category or may be defined by alert policies 144. In this way, enterprise business leadership may compare the coaching rates of regions, districts, or branches to the enterprise business baseline coaching rates. For example, graph 1000 shows that the coaching rate off monitoring category A is above the coaching rate baseline (e.g., bar 1002 is above baseline coaching rate 1012A). For another example, graph 1000 shows that the coaching rate of monitoring category D is below the coaching rate baseline (e.g., bar 1008 is below baseline coaching rate 1012C). While five monitoring categories are shown in FIG. 10A, it should be understood that fewer or more monitoring categories may be presented to a user.

FIG. 10B is a graph 1050 illustrating example disposition information according to the techniques of this disclosure. In particular, graph 1050 illustrates on-time disposition rates baseline comparisons by monitoring category. In some examples, graph 1050 represents data presented by supervisory devices 108. However, it should be understood that other computer devices may be configured to present such data. In some examples, the data shown in graph 1050 may have been transmitted to supervisory devices 108 with the data illustrated in FIG. 9B or 10A. In this way, supervisory devices 108 need not request the additional data in response to a user selecting a respective district from graph 950 of FIG. 9B. In some examples, graphs 1000 and 1050 are presented together by supervisory devices 108.

As shown in FIG. 10B, graph 1050 shows five monitoring categories by name with the on-time disposition rates corresponding to each monitoring category represented by bars 1052-1060. In some examples, on-time disposition rates shown in FIG. 10B may correspond to a region, district, or branch. For example, the on-time disposition rates shown in FIG. 10B may correspond to a district selected from graph 950 of FIG. 9B. Graph 1050 further shows lines 1062A-1062E corresponding to the respective baseline on-time disposition rate for each monitoring category (collective, "baseline on-time disposition rates 1062"). In some examples, the baseline on-time disposition rates 1062 may be the average on-time disposition rate for the entire business enterprise for the corresponding monitoring category or may be defined by alert policies 144. In this way, enterprise business leadership may compare the on-time disposition rates of regions, districts, or branches to the enterprise business baseline on-time disposition rates. For example, graph 1050 shows that the on-time disposition rate of monitoring category A is above the on-time disposition rate baseline (e.g., bar 1052 is above baseline on-time disposition rate 1062A). For another example, graph 1050 shows that the on-time disposition rate of monitoring category D is below the on-time disposition rate baseline (e.g., bar 1058 is below baseline on-time disposition rate 1062C). While five monitoring categories are shown in FIG. 10B, it should be understood that fewer or more monitoring categories may be presented to a user.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
generating, by one or more branch terminals within a computing system of an enterprise business, a plurality of alerts corresponding to a plurality of districts within the enterprise business, wherein each alert of the plurality of alerts indicates a type of abnormal behavior arising from a transaction associated with a corresponding district of the plurality of districts and performed by or on behalf of a customer of the enterprise business;
receiving, by a central computing device within the computing system from the one or more branch terminals, alert information for the plurality of alerts;
calculating, by the central computing device and based on the alert information, an alert volume for a period of time for each district of the plurality of districts of the enterprise business;
calculating, by the central computing device, an average alert volume during the period of time for the enterprise business;
calculating, by the central computing device, a standard deviation of the average alert volume during the period of time for the enterprise business;
assigning, by the central computing device, a risk rating to each district of the plurality of districts based on a comparison between the alert volume corresponding to each district of the plurality of districts and the average alert volume and the standard deviation for the enterprise business;
receiving, by the central computing device, a request for alert analytics from a supervisory device;
based on the request for alert analytics, transmitting, by the central computing device, data representative of both a first user interface and a second user interface to the supervisory device;
displaying, by the supervisory device using the data representative of the first user interface, the first user interface including a set of volume icons, each volume icon representing the alert volume corresponding to a respective district of the plurality of districts, a graphical representation of the average alert volume, and a graphical representation of the standard deviation, wherein each volume icon includes an indication of the risk rating assigned to the respective district, and wherein each volume icon is selectable; and
based on a selection of a first volume icon representing the alert volume corresponding to a first district from the set of volume icons included in the first user interface by a user of the supervisory device, displaying, by the supervisory device using the data representative of the second user interface, the second user interface including one or more category icons representing one or more monitoring categories of the alert volume corresponding to the first district without sending another request from the supervisory device to the central computing device for additional data representative of the second user interface in response to the selection of the first volume icon included in the first user interface.

2. The method of claim 1, wherein assigning the risk rating to each district of the plurality of districts includes:
assigning a low risk rating to one or more first districts of the plurality of districts having alert volumes that are below the average alert volume during the period of time;
assigning a moderate risk rating to one or more second districts of the plurality of districts having alert volumes that are equal to or above the average alert volume and that are below the standard deviation of the average alert volume during the period of time; and
assigning a high risk rating to one or more third districts of the plurality of districts having alert volumes that are equal to or above the standard deviation of the average alert volume during the period of time.

3. The method of claim 1, further comprising:
calculating, by the central computing device, a weighted alert score for each alert of the plurality of alerts; and
wherein calculating the alert volume for the period of time corresponding to each district of the plurality of districts comprises totaling the weighted alert score for each alert received during the period of time corresponding to each district of the plurality of districts.

4. The method of claim 1, wherein the set of volume icons in the first user interface includes bars in a bar graph, and wherein the bar graph comprises a first bar corresponding to a first alert volume of a first district of the plurality of districts, a second bar corresponding to a second alert volume of a second district of the plurality of districts, and a third bar corresponding to a third alert volume of a third district of the plurality of districts.

5. The method of claim 4, wherein the indication of the risk rating assigned to the respective district comprises color, and wherein the first bar is a first color corresponding to a low risk rating, the second bar is a second color corresponding to a moderate risk rating, and the third bar is a third color corresponding to a high risk rating.

6. The method of claim 4, wherein the bar graph includes a first line as the graphical representation of the average alert volume and a second line as the graphical representation of the standard deviation of the average alert volume.

7. The method of claim 4, wherein the first bar, the second bar, and the third bar are selectable via the first user interface displayed by the supervisory device, the method further comprising:
based on a selection of the first bar, displaying, by the supervisory device, one or more first category icons representing one or more monitoring categories of the first alert volume corresponding to the first district of the plurality of districts;
based on a selection of the second bar, displaying, by the supervisory device, one or more second category icons representing one or more monitoring categories of the second alert volume corresponding to the second district of the plurality of districts; and
based on a selection of the third bar, displaying, by the supervisory device, one or more third category icons representing one or more monitoring categories of the third alert volume corresponding to the third district of the plurality of districts.

8. A computing system comprising:
one or more branch terminals configured to generate a plurality of alerts corresponding to a plurality of districts within an enterprise business, wherein each alert of the plurality of alerts indicates a type of abnormal behavior arising from a transaction associated with a corresponding district of the plurality of districts and performed by or on behalf of a customer of the enterprise business;
a central computing device comprising a processor implemented in circuitry and configured to:
receive alert information for the plurality of alerts from the one or more branch terminals;

calculate, based on the alert information, an alert volume for a period of time for each district of the plurality of districts of the enterprise business;

calculate an average alert volume during the period of time for the enterprise business;

calculate a standard deviation of the average alert volume during the period of time for the enterprise business;

assign a risk rating to each district of the plurality of districts based on a comparison between the alert volume corresponding to each district of the plurality of districts and the average alert volume and the standard deviation for the enterprise business;

receive a request for alert analytics from a supervisory device; and based on the request for alert analytics, transmit data representative of both a first user interface and a second user interface to the supervisory device; and the supervisory device comprising a processor implemented in circuitry and configured to:

display, using the data representative of the first user interface, the first user interface including a set of volume icons, each volume icon representing the alert volume corresponding to a respective district of the plurality of districts, a graphical representation of the average alert volume, and a graphical representation of the standard deviation, wherein each volume icon includes an indication of the risk rating assigned to the respective district, and wherein each volume icon is selectable; and based on a selection of a first volume icon representing the alert volume corresponding to a first district from the set of volume icons included in the first user interface by a user of the supervisory device, display, using the data representative of the second user interface, the second user interface including one or more category icons representing one or more monitoring categories of the alert volume corresponding to the first district without sending another request from the supervisory device to the central computing device for additional data representative of the second user interface in response to the selection of the first volume icon included in the first user interface.

9. The computing system of claim 8, wherein to assign the risk rating to each district of the plurality of districts, the processor of the central computing device is configured to:

assign a low risk rating to one or more first districts of the plurality of districts having alert volumes that are below the average alert volume during the period of time;

assign a moderate risk rating to one or more second districts of the plurality of districts having alert volumes that are equal to or above the average alert volume and that are below the standard deviation of the average alert volume during the period of time; and assign a high risk rating to one or more third districts of the plurality of districts having alert volumes that are equal to or above the standard deviation of the average alert volume during the period of time.

10. The computing system of claim 8, wherein the set of volume icons in the first user interface includes bars in a bar graph, and wherein the bar graph comprises a first bar corresponding to a first alert volume of a first district of the plurality of districts, a second bar corresponding to a second alert volume of a second district of the plurality of districts, and a third bar corresponding to a third alert volume of a third district of the plurality of districts.

11. The computing system of claim 10, wherein the indication of the risk rating assigned to the respective district comprises color, and wherein the first bar is a first color corresponding to a low risk rating, the second bar is a second color corresponding to a moderate risk rating, and the third bar is a third color corresponding to a high risk rating.

12. The computing system of claim 10, wherein the bar graph includes a first line as the graphical representation of the average alert volume and a second line as the graphical representation of the standard deviation of the average alert volume.

13. The computing system of claim 10, wherein the first bar, the second bar, and the third bar are selectable via the first user interface displayed by the supervisory device, and wherein the processor of the supervisory device is configured to:

based on a selection of the first bar, display one or more first category icons representing one or more monitoring categories of the first alert volume corresponding to the first district of the plurality of districts;

based on a selection of the second bar, display one or more second category icons representing one or more monitoring categories of the second alert volume corresponding to the second district of the plurality of districts; and based on a selection of the third bar, display one or more third category icons representing one or more monitoring categories of the third alert volume corresponding to the second district of the plurality of districts.

14. The method of claim 1, wherein each category icon of the one or more category icons included in the second user interface includes an indication of a percentage or proportion of a respective monitoring category of the one or more monitoring categories with respect to the alert volume corresponding to the first district.

15. The method of claim 1, wherein transmitting the data representative of the first user interface and the second user interface further includes transmitting data representative of a third user interface in response to the request for alert analytics from the supervisory device;

wherein each category icon of the one or more category icons included in the second user interface is selectable; and wherein the method further comprises, based on a selection of a first category icon representing a first monitoring category of the alert volume corresponding to the first district from the one or more category icons included in the second user interface, displaying, by the supervisory device, the third user interface including one or more name icons representing one or more alert names within the first monitoring category of the alert volume corresponding to the first district.

16. The method of claim 15, wherein each name icon of the one or more name icons included in the third user interface includes an indication of a percentage or proportion of a respective alert name of the one or more alert names within the first monitoring category of the alert volume corresponding to the first district.

17. The computing system of claim 8, wherein each category icon of the one or more category icons included in the second user interface includes an indication of a percentage or proportion of a respective monitoring category of the one or more monitoring categories with respect to the alert volume corresponding to the first district.

18. The computing system of claim 8,
wherein to transmit the data representative of the first user interface and the second user interface, the processor of the central computing device is further configured to transmit data representative of a third user interface in response to the request for alert analytics from the supervisory device;
wherein each category icon of the one or more category icons included in the second user interface is selectable; and
wherein the processor of the supervisory device is configured to, based on a selection of a first category icon representing a first monitoring category of the alert volume corresponding to the first district from the one or more category icons included in the second user interface, display the third user interface including one or more name icons representing one or more alert names within the first monitoring category of the alert volume corresponding to the first district.

19. The computing system of claim 18, wherein each name icon of the one or more name icons included in the third user interface includes an indication of a percentage or proportion of a respective alert name of the one or more alert names within the first monitoring category of the alert volume corresponding to the first district.

20. Non-transitory computer-readable storage media including instructions that, when executed, cause one or more programmable processors to:
generate, at one or more branch terminals within a computing system of an enterprise business, a plurality of alerts corresponding to a plurality of districts within the enterprise business, wherein each alert of the plurality of alerts indicates a type of abnormal behavior arising from a transaction associated with a corresponding district of the plurality of districts and performed by or on behalf of a customer of the enterprise business;
receive, at a central computing device within the computing system from the one or more branch terminals, alert information for the plurality of alerts;
calculate, at the central computing device and based on the alert information, an alert volume for a period of time for each district of the plurality of districts of the enterprise business;
calculate, at the central computing device, an average alert volume during the period of time for the enterprise business;
calculate, at the central computing device, a standard deviation of the average alert volume during the period of time for the enterprise business;
assign, at the central computing device, a risk rating to each district of the plurality of districts based on a comparison between the alert volume corresponding to each district of the plurality of districts and the average alert volume and the standard deviation for the enterprise business;
receive, at the central computing device, a request for alert analytics from a supervisory device;
based on the request for alert analytics, transmit, from the central computing device, data representative of both a first user interface and a second user interface to the supervisory device;
display, at the supervisory device using the data representative of the first user interface, the first user interface including a set of volume icons, each volume icon representing the alert volume corresponding to a respective district of the plurality of districts, a graphical representation of the average alert volume, and a graphical representation of the standard deviation, wherein each volume icon includes an indication of the risk rating assigned to the respective district, and wherein each volume icon is selectable; and
based on a selection of a first volume icon representing the alert volume corresponding to a first district from the set of volume icons included in the first user interface by a user of the supervisory device, display, at the supervisory device using the data representative of the second user interface, the second user interface including one or more category icons representing one or more monitoring categories of the alert volume corresponding to the first district without sending another request from the supervisory device to the central computing device for additional data representative of the second user interface in response to the selection of the first volume icon included in the first user interface.

* * * * *